(12) United States Patent
Sasaki (10) Patent No.: US 9,488,762 B2
(45) Date of Patent: Nov. 8, 2016

(54) POLARIZING ELEMENT WITH MOTH EYE STRUCTURE BETWEEN PROJECTION PORTIONS AND A METHOD FOR MANUFACTURING THE SAME

(71) Applicant: DEXERIALS CORPORATION, Tokyo (JP)

(72) Inventor: Koji Sasaki, Miyagi (JP)

(73) Assignee: DEXERIALS CORPORATION, Tokyo (JP)

( * ) Notice: Subject to any disclaimer, the term of this patent is extended or adjusted under 35 U.S.C. 154(b) by 132 days.

(21) Appl. No.: 13/767,511

(22) Filed: Feb. 14, 2013

(65) Prior Publication Data

US 2013/0215508 A1 Aug. 22, 2013

(30) Foreign Application Priority Data

Feb. 16, 2012 (JP) ................................. 2012-032055

(51) Int. Cl.
G02B 5/30 (2006.01)
G02B 1/11 (2015.01)

(52) U.S. Cl.
CPC ............... *G02B 5/3025* (2013.01); *G02B 1/11* (2013.01); *G02B 5/3058* (2013.01)

(58) Field of Classification Search
None
See application file for complete search history.

(56) References Cited

U.S. PATENT DOCUMENTS

| 5,305,143 A * | 4/1994 | Taga et al. ............... 359/485.01 |
| 2004/0156108 A1* | 8/2004 | Chou et al. ................. 359/566 |
| 2006/0262398 A1* | 11/2006 | Sangu et al. ................. 359/486 |
| 2007/0242187 A1* | 10/2007 | Yamaki et al. ................. 349/96 |
| 2008/0186576 A1* | 8/2008 | Takada ........................... 359/492 |
| 2009/0009865 A1* | 1/2009 | Nishida ................ G02B 5/3058 359/485.01 |
| 2011/0170186 A1* | 7/2011 | Sawaki ..................... 359/485.01 |
| 2011/0170187 A1* | 7/2011 | Sawaki ..................... 359/485.03 |
| 2012/0224380 A1* | 9/2012 | Ushiyama et al. ...... 362/311.01 |
| 2013/0128362 A1* | 5/2013 | Song ...................... B82Y 20/00 359/601 |

FOREIGN PATENT DOCUMENTS

JP A-2007-148344 6/2007
WO WO 2011052739 A1 * 5/2011

* cited by examiner

*Primary Examiner* — Stephone B Allen
*Assistant Examiner* — Ryan S Dunning
(74) *Attorney, Agent, or Firm* — Oliff PLC (57) ABSTRACT

Provided is a polarizing element in which a desired polarization characteristics are achieved and the transmissivity is also good. The polarizing element comprises: a substrate transparent to light having a bandwidth to be used; and a grid pattern made of a translucent material and configured such that a plurality of projection portions continuous in one in-plane direction of said substrate are formed on a surface of the substrate at a pitch smaller than a wavelength of light having a bandwidth to be used, wherein each of the projection portions includes a base portion with a rectangular cross-section and a tapered surface portion formed at a top of the base portion, a fine particle layer made of an inorganic material is laminated on at least one surface of said tapered surface portion, and the fine particle layer does not protrude over a side face of the base portion.

12 Claims, 8 Drawing Sheets

POLARIZING ELEMENT WITH MOTH EYE STRUCTURE BETWEEN PROJECTION PORTIONS AND A METHOD FOR MANUFACTURING THE SAME

BACKGROUND OF THE INVENTION

1. Field of the Invention

The present invention relates to a polarizing element typified by a polarizing plate, polarizing filter, or the like, and a method for the polarizing element.

2. Description of the Related Art

In liquid crystal displays, particularly transmissive liquid crystal display devices, based on the principle of image formation, it is essential to dispose a polarizing plate on a surface of a liquid crystal panel. In recent years, development of liquid crystal displays being miniaturized and having high-luminance has been promoted, and polarizing plates having high heat-resistance and high light-resistance have been needed accordingly. For example, in the case of liquid crystal displays in which a light source having a large quantity of light, such as a transmissive type liquid crystal projector, is used, a polarizing plate receives a strong radiant ray. Accordingly, excellent heat-resistance is needed for the polarizing plate used for these liquid crystal displays.

Conventional polarizing plates using an organic film have insufficient heat-resistance and light-resistance, and, due to a strong radiant heat from a high-luminance light source, remarkable deterioration of the polarization characteristics has been observed. On the other hand, a wire grid type polarizing plate including a metal fine grid has been proposed. The wire grid type polarizing plate is configured such that a plurality of metal thin lines are formed in grid-like fashion on a substrate, wherein a polarization component parallel to the metal thin lines is absorbed or reflected while a polarization component perpendicular to the metal thin lines is transmitted, whereby predetermined polarization characteristics appear.

A metal fine grid is obtained in such a manner that a metal film, such as aluminum, is deposited on a substrate by sputtering, evaporation, or the like, and a high-density fine resist pattern is formed on this metal film by photo lithography, such as interference exposure. However, at the time of the exposure of the high-density fine resist pattern, a reflective interference light from a surface of the metal film generates, thereby making the resist pattern shape not a simple rectangular shape but a shape whose width is locally constricted with respect to the height direction. As a countermeasure against this, a bottom anti-reflection coating (BARC) is applied under a resist layer to reduce the constricted portion. However, it is not possible to prevent occurrence of the constricted portion completely.

When the constricted portion appears in the resist pattern, the resist pattern easily falls, and the pattern falling prevents resolution, and thus leads to degradation of resolution characteristics. In other words, when a resist pattern falls, the resist pattern cannot become a processing mask at all, whereby desired polarization characteristics cannot be achieved.

Furthermore, a constricted portion in a resist pattern causes not only a pattern falling problem, but also, in the case where the resist pattern is used as a mask for dry etching, causes process instability, such as variation in etching rate, whereby productivity is worsened and manufacturing cost becomes higher.

As a solution to such problems, there has been proposed a polarizing element which is obtained in such a manner that a pattern formation layer is provided on a substrate transparent to visible light by using a material transparent to visible light, such as $SiO_2$, to form a grid-like projection and depression portion, and then an inorganic fine particle layer made of an aluminum material or a semiconductor material is provided in a top portion or at least one side portion of said projection and depression portion from a direction oblique with respect to a surface of a substrate. (Refer to Japanese Patent Application Laid-Open No. 2007-148344). In this polarizing plate, a projection and depression portion having a texture structure is formed by lapping or rubbing using a polishing sheet, or by die transcription, whereby, without pattern etching, an inorganic fine particle layer having a desired fine shape can be formed.

Figure 8:
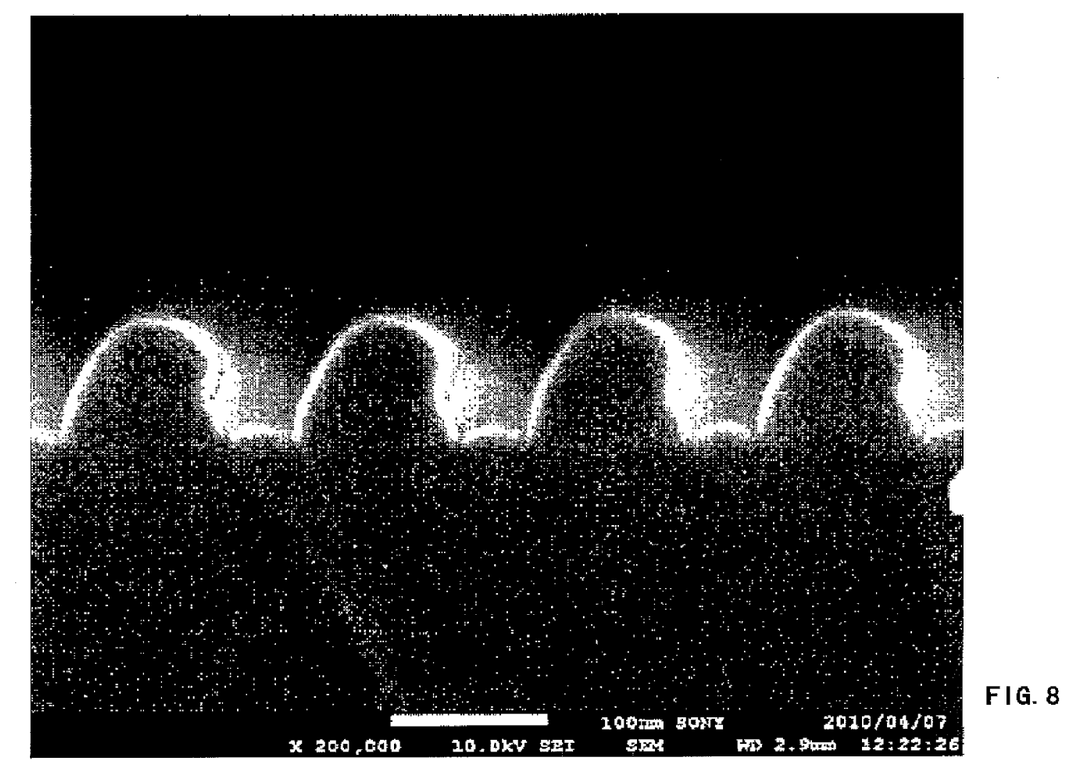
FIG. 8 illustrates a SEM image showing a grid pattern.
Figure 9A:
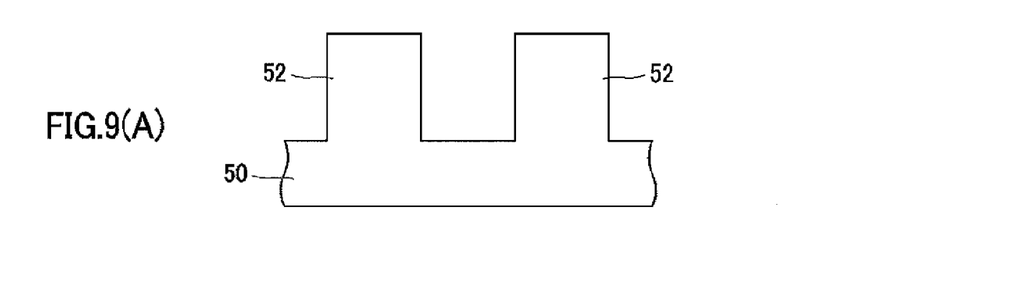
FIG. 9(A), FIG. 9(B) and FIG. 9(C) are sectional views illustrating a grid pattern in which a fine particle layer is formed in a conventional projection and depression portion.
Figure 9B:
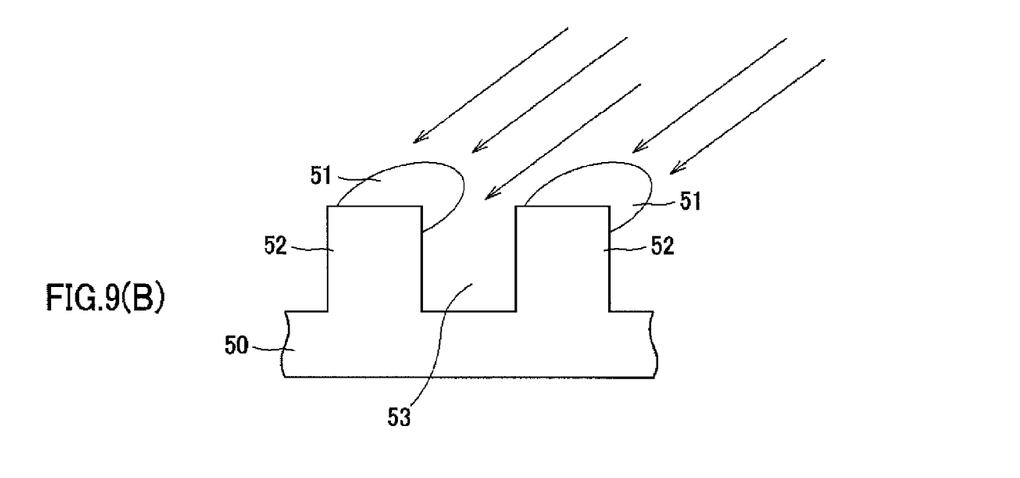
Figure 9C:
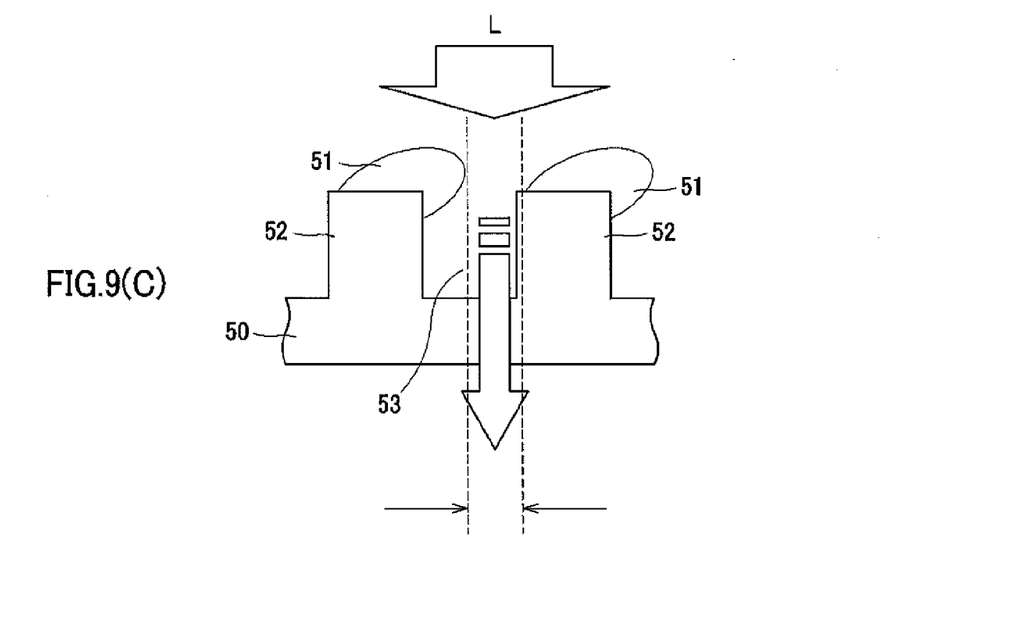

However, depending on a shape of the projection and depression portion, as shown in FIG. 8, when metal fine particles 51 are made to adhere from a direction oblique with respect to a surface of a substrate 50, the metal fine particles 51 protrude over a space 53 between a projection portion 52 and a depression portion 52, whereby a transmissivity of light L is decreased. This tendency becomes remarkable as a grid pattern is made finer. For polarizing elements, transmissivity is an important factor as well as contrast in the evaluation of the characteristics, and accordingly, there is desired a polarizing element in which a desired grid pattern is formed and also a transmissivity is not lost.

The present invention has been made in view of the above-mentioned problems, and aims at providing a polarizing element having desired polarization characteristics in a visible light region and a good light transmissivity, and a method for manufacturing the polarizing element.

SUMMARY OF THE INVENTION

To solve the above-mentioned problems, a polarizing element according to the present invention comprises: a substrate transparent to light having a bandwidth to be used; and a grid pattern made of a translucent material and configured such that a plurality of projection portions continuous in one in-plane direction of said substrate are formed on a surface of the substrate at a pitch smaller than a wavelength of light having a bandwidth to be used, wherein each of the projection portions includes a base portion with a rectangular cross-section and a tapered surface portion formed at a top of the base portion, a fine particle layer made of an inorganic material is laminated on at least one surface of said tapered surface portion, and the fine particle layer does not protrude over a side face of the base portion.

A method for manufacturing the polarizing element according to the present invention comprises the steps of: forming a grid pattern configured such that a plurality of projection portions are formed on a surface of a translucent substrate at a pitch smaller than a wavelength of light having a bandwidth to be used, each of the projection portions continuous in one in-plane direction of said translucent substrate including a base portion with a rectangular cross-section and a tapered surface portion formed at a top of the base portion; and forming a fine particle layer which does not protrude over a side face of the base portion, by laminating inorganic fine particles on the tapered surface portion from an oblique direction.

According to the present invention, in a polarizing element, a fine particle layer laminated on a projection portion constituting a grid pattern is made to deposit on a tapered surface portion and does not protrude over a side face of a base portion. In other words, in the grid pattern, the fine particle layer does not protrude between the projection portions, whereby, without blocking light to be transmitted between the projection portions, the transmissivity of a substrate can be maintained high.

Furthermore, in the polarizing element, the grid pattern is provided directly on the substrate without providing a metal film thereon, whereby, even if a resist pattern is formed by photo lithography, such as interference exposure, pattern falling and a constricted portion are not caused, and therefore, a fine grid pattern can be formed with high precision by etching.

Furthermore, in the polarizing element, by switching between isotropic etching and anisotropic etching, a projection portion including a base portion and a tapered surface portion provided on a top face of the base portion is formed. The base portion is provided so that the projection portion has a predetermined height. Thus, in the polarizing element, the grid pattern with a high contrast can be formed.

BRIEF DESCRIPTION OF THE DRAWINGS

FIG. 1(A) and FIG. 1(B) illustrate a polarizing element according to the present invention, and FIG. 1(A) is a sectional view while

FIG. 2(A) and FIG. 2(B) are sectional views illustrating projection portions of a grid pattern 3, and FIG. 2(A) illustrates the projection portions before laminating a fine particle layer while

DETAILED DESCRIPTION OF THE PREFERRED EMBODIMENTS

Hereinafter, a polarizing element according to the present invention and a method for manufacturing the same will be explained in detail with reference to the drawings. Note that the present invention is not limited only to the following embodiment, and it is a matter of course that various changes can be made within the scope not deviating from the gist of the present invention. Moreover, the drawings are schematic and are not necessarily to the actual ratio of each dimension or the like. Specific dimensions and the like should be judged in consideration of the following explanation. Furthermore, it is a matter of course that there is sometimes a difference also in relation or ratio of dimension between the drawings.

[Configuration of Polarizing Element 1]

Figure 1A:
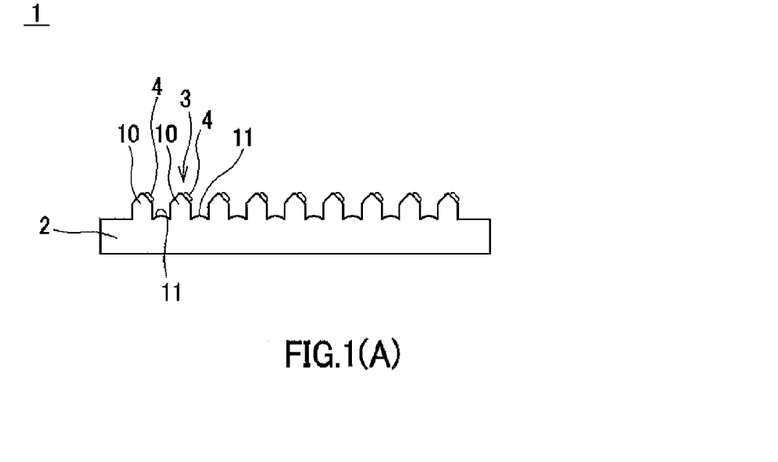
Figure 1B:
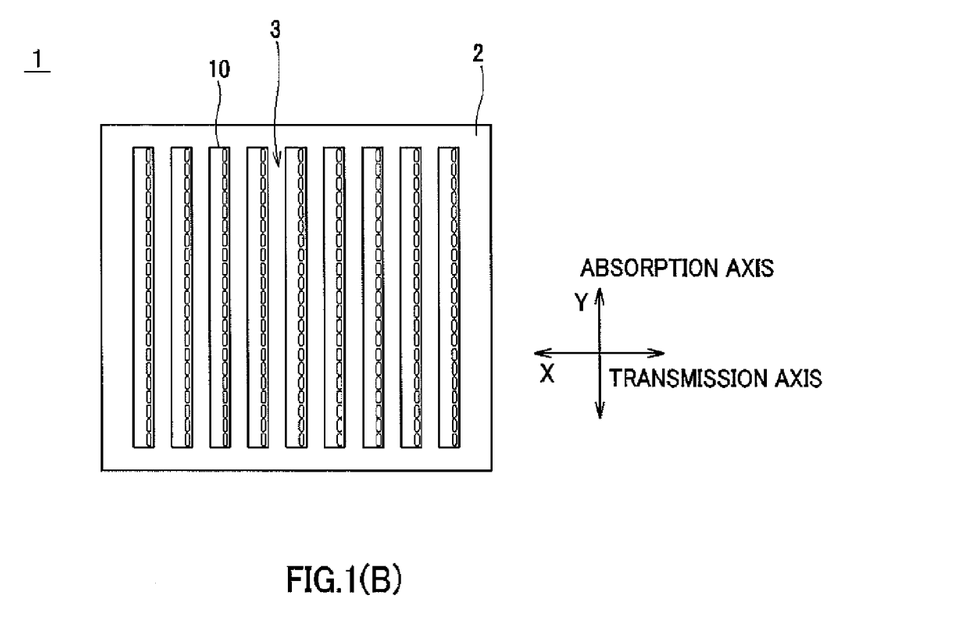
FIG. 1(B) is a plan view.

As shown in FIG. 1(A) and FIG. 1(B), a polarizing element 1 according to the present invention comprises a substrate 2 transparent to light having a bandwidth to be used, a grid pattern 3 made of a translucent material and formed on a surface of the substrate 2, and a fine particle layer 4 made of an inorganic material and formed on a top face of a projection portion of the grid pattern 3. The polarizing element 1 is a resonance absorption type inorganic polarizing element which develops desired polarization characteristics by using the difference in optical absorptance due to optical anisotropy in an in-plane axis direction of inorganic fine particles formed in an island-shape on the substrate 2.

For the substrate 2, any of inorganic and organic materials which are transparent to light having a bandwidth to be used, for example, visible light, may be used, but a substrate 2 made of glass, ceramic material, or the like is preferable because the heat-resistance is increased. Furthermore, the use of a material with high heat-conductivity, such as rock crystal or sapphire, enables heat radiation to be increased and heat resistance to be improved. In the present embodiment, glass, particularly rock crystal is preferably used for the substrate 2.

The grid pattern 3 is formed in a predetermined grid shape by micromachining, such as etching, on a surface of the substrate 2. In this grid pattern 3, an underlayer of the maicroparticle layer 4 is formed, and a processing size and a pattern shape of the grid pattern 3 determine optical characteristics of the polarizing element 1 which depend on a shape of the fine particle layer 4. By forming the grid pattern 3 in a grid shape, a shape anisotropy is provided to the fine particle layer 4 formed on a top face of the projection portion 10.

Figure 2A:
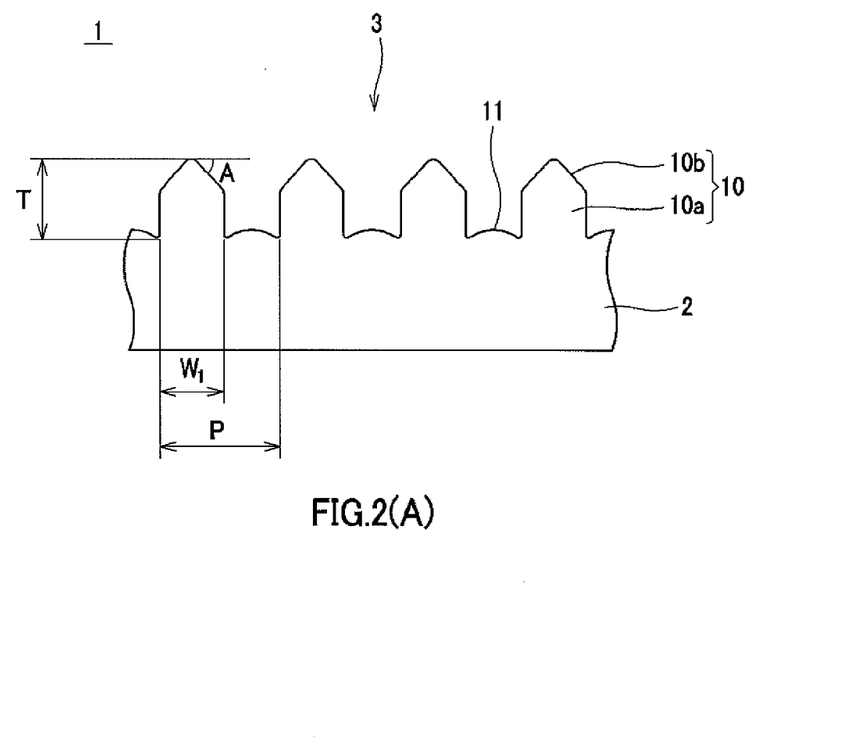
Figure 2B:
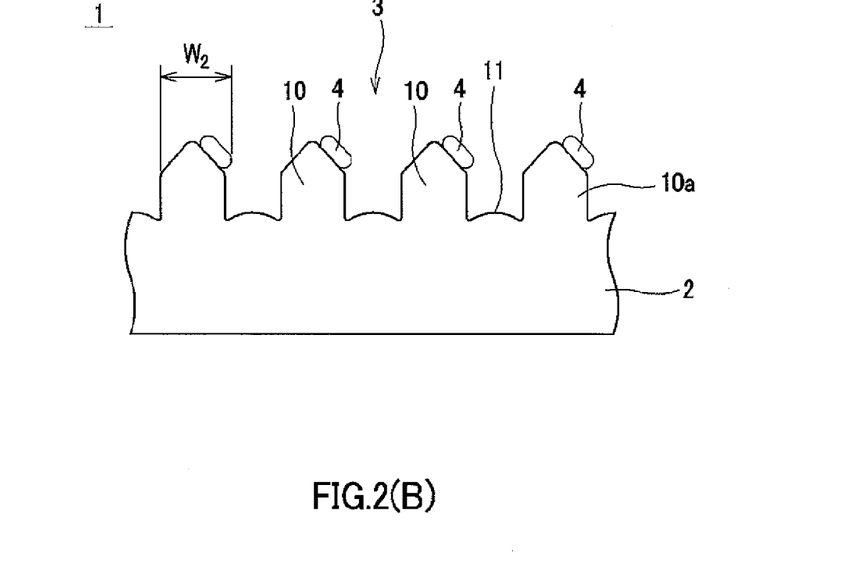
FIG. 2(B) illustrates the projection portions after laminating the fine particle layer.

The grid pattern 3 is configured such that a plurality of projection portions 10 continuous in one in-plane direction of the substrate 2, that is, in a direction of arrow Y in FIG. 1(B), are formed over a direction of arrow X in FIG. 1(B) at a pitch smaller than a wavelength of light having a bandwidth to be used. As shown in FIG. 2(A) and FIG. 2(B), in a cross-sectional view in a direction of arrow X in FIG. 1(B) the projection portion 10 includes a base portion 10a having an approximately rectangular shape, and a tapered surface portion 10b formed at a top of the base portion 10a and tapered from the both sides toward the top of the projection portion 10, wherein the fine particle layer 4 made of an inorganic material is laminated on at least one surface of the tapered surface portion 10b.

In the polarizing element 1, the fine particle layer 4 is formed on the tapered surface portion 10b of the projection portion 10, whereby inorganic fine particles are distributed in an island shape over a surface of the substrate 2. This fine particle layer 4 is made of, for example, aluminum fine particles, and, as described later, is film-formed by ion beam sputtering from a direction oblique with respect to the surface of the substrate 2. Thus, the fine particle layer 4 made of aluminum fine particles is laminated on at least one surface of the tapered surface portion 10b of the projection portion 10.

At this time, in the projection portion 10, the maicroparticle layer 4 deposits on the tapered surface portion 10b, and does not protrude over a side face of the base portion 10a. In other words, in the grid pattern 3, a ratio of an upper portion line width of the projection portion 10 to a lower portion line width thereof is less than 1.0, and since the fine particle layer 4 does not protrude between the projection portions 10, without blocking light to be transmitted between the projection portions 10, the transmissivity of the substrate 2 can be maintained high. Moreover, by providing the base portion 10a, the projection portion 10 is made to have a predetermined height. Thus, the grid pattern 3 has a high contrast.

In the grid pattern 3, processing size and pattern shape are suitably set in accordance with desired polarization characteristics (extinction ratio) and target visible light wavelength. Specifically, the grid pattern 3 is as follows:

Pitch P of the projection portion 10: 100 nm to 250 nm,
Lower-portion width $W_1$ of the projection portion 10: 50 nm to 200 nm,
(Lower-portion width $W_1$ of the projection portion 10)/(Pitch P of the projection portion 10): not less than 0.55,
Height T of the projection portion 10: 20 nm to 200 nm,
Taper angle A of the tapered surface portion 10b: 30° to 75°, and
(Upper-portion width $W_2$ composed of an upper portion of the projection portion 10 and the fine particle layer 4)/(Lower-portion width $W_1$ of the projection portion 10): less than 1.0.

Furthermore, a thickness of the fine particle layer 4 is not more than 100 nm.

[Method for Manufacturing Polarizing Element 1]

Figure 3A:
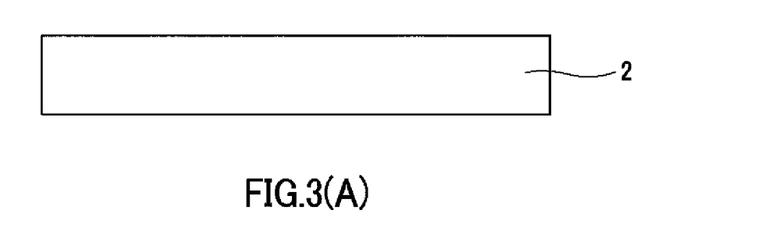
FIG. 3(A), FIG. 3(B) and FIG. 3(C) illustrate the steps of manufacturing the polarizing element according to the present invention.
Figure 3B:
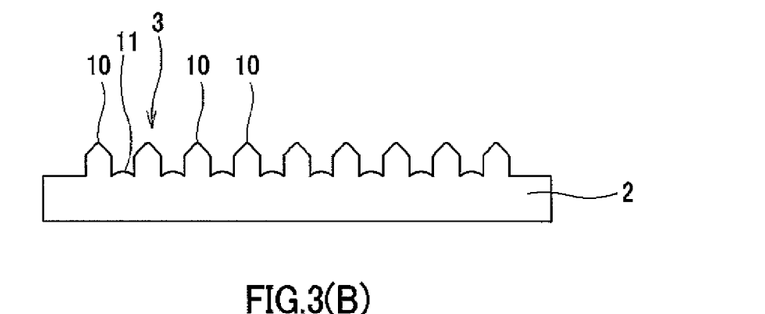

Next, a method for manufacturing a polarizing element will be explained. First, as shown in FIG. 3(A), a translucent substrate 2 made of such as rock crystal is prepared. Subsequently, as shown in FIG. 3(B), a grid pattern 3 is formed on a surface of the substrate 2. The grid pattern 3 is formed, for example, in such a manner that a resist mask according to the grid pattern 3 is applied, and then, after exposure and development, etching is performed. At this time, after anisotropic and isotropic etching, isotropic etching is performed, whereby there are formed a base portion 10a having an approximately rectangular shape and a tapered surface portion 10b obtained by forming a pair of tapers on an upper portion of the base portion 10a at a predetermined angle A.

The tapered surface portion 10b is angled by controlling the gas pressure of an etching gas. As described later, the tapered surface portion 10b preferably has an angle range of 35° to 75°. In making the angle and controlling the gas pressure, depending on types of a material of the substrate 2 or etching gas, and the like, optimum conditions of a degree of vacuum, a gas flow rate, and the like can be experimentally found.

An example of the etching condition is shown as follows: $CF_4$ is used as a fluorine gas, Gas flow rate: 25 sccm, Power: 120 W, Bias: 60 W, and Etching time: 120 sec. Moreover, the height T of the projection portion 10 thus-formed is 15 to 30 nm.

Figure 3C:
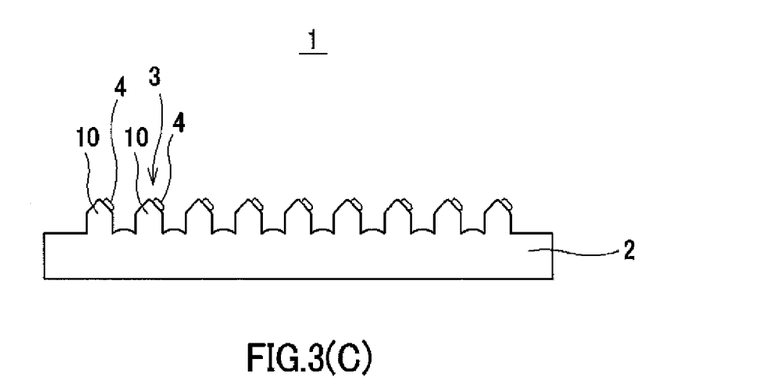
Figure 4:
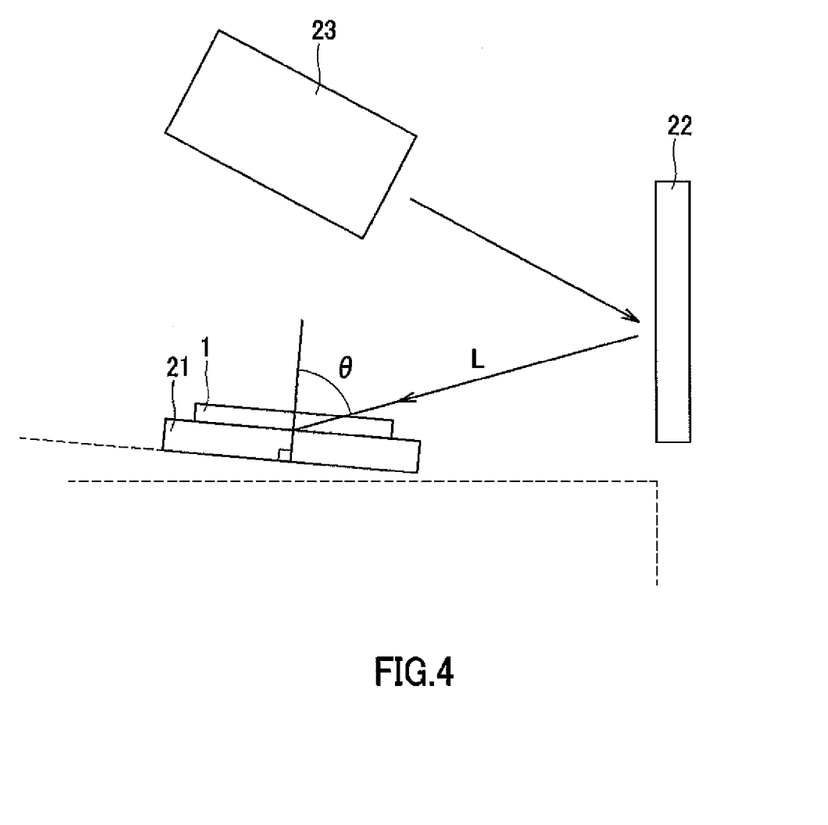
FIG. 4 illustrates a method for laminating a fine particle layer.

Next, as shown in FIG. 3(C), the fine particle layer 4 is formed on the tapered surface portion 10b. As shown in FIG. 4, the fine particle layer 4 is formed by ion beam sputtering from an oblique direction. In FIGS. 4, 21, 22, and 23 represents a stage on which the substrate 2 is placed, a target, and a beam source (ion source), respectively.

In the stage 21, the substrate 2 is disposed so that a grid direction (longitudinal direction) of the grid pattern 3 is perpendicular to an incident direction of inorganic fine particles, such as aluminum fine particles. Furthermore, the stage 21 is inclined at a predetermined angle in a normal line direction of the target 22, whereby, according to a height of the base portion 10a and an angle of the tapered surface portion 10b, an incident angle θ of inorganic fine particles to the grid pattern 3 (an angle formed by a normal line of the substrate 2 and an incident direction L of inorganic fine particles) is set so as to form the fine particle layer 4 only on the tapered surface portion 10b, for example, to be 87° to 60°. When the incident angle is too smaller than this, many inorganic fine particles adhere not only onto the tapered surface portion 10b but also onto the bottom part of the base portion 10a, whereby transmissivity characteristics are decreased.

The target 22 is irradiated with ions derived from the beam source 23. Inorganic fine particles reflected from the target 22 by irradiation of the ion beam come to a surface of the substrate 2 from an oblique direction at a predetermined incident angle θ, and adhere to the tapered surface portion 10b.

In this way, by inclining the substrate 2 to the target 22 and prescribing an incident direction of inorganic fine particles, the fine particle layer 4 made of inorganic fine particles can be selectively formed on the tapered surface portion 10b of the projection portion 10. As a result, the fine particle layer 4 having a shape anisotropy can be made in a desired fine shape and distributed in an island shape on a surface of the substrate 2. Furthermore, at this time, according to a height of the base portion 10a and an angle of the tapered surface portion 10b, an incident angle θ is set, for example, to be 87° to 60°, whereby the fine particle layer 4 is formed on the tapered surface portion 10b of the projection portion 10 and does not protrude over a side of the base portion 10a.

The fine particle layer 4 may be formed by a method other than ion beam sputtering, for example, oblique evaporation. However, in the case where the particle layer 4 is formed by ion beam sputtering, incident particles have higher energy, as compared with the case of evaporation, whereby adhering strength of metal fine particles to the substrate 2, which is important to secure reliability of a device, can be improved. In addition, a substance to be evaporated is greatly limited depending on characteristics of the substance, such as vapor pressure, but sputtering has no such limitation, and accordingly, also from the viewpoint that a wider choice of a substance is allowed, ion beam sputtering is more advantageous.

Note that, in the substrate 2, an anti-reflection coating, not illustrated, to control a reflection component to incident light may be provided on a face opposite to a face on which the grid pattern 3 is formed. As the anti-reflection coating, a common anti-reflection coating material of evaporation of a single layer or a multilayer may be used.

In the polarizing element 1, a protection layer may be formed on the fine particle layer 4. Common materials, such as $SiO_2$, $Al_2O_3$, and $MgF_2$, may be used for the protection layer. These can be made a thin film by common vacuum film-forming, such as sputtering, vapor growth, or evaporation, or by coating and heat curing a sol substance on the substrate 2.

[Effect of Polarizing Element]

In this polarizing element 1, the fine particle layers 4 made of an inorganic material and formed on a surface of the substrate 2 are distributed in a shape anisotropic with respect to in-plane directions X and Y, as shown in FIG. 1(B), These particle layers 4 absorb a polarization component having an electromagnetic movement direction in a direction of the major axis (direction Y), while transmit a polarization component having an electromagnetic movement direction in a direction of the minor axis (direction X).

Furthermore, in the polarizing element 1, the fine particle layer 4 of the projection portion 10 constituting the grid pattern 3 is deposited on the tapered surface portion 10b and does not protrude over a side face of the base portion 10a. In other words, in the grid pattern 3, the fine particle layer 4 does not protrude between the projection portions 10, whereby, without blocking light to be transmitted between the projection portions 10, the transmissivity of the substrate 2 can be maintained high.

Furthermore, in the polarizing element 1, the grid pattern 3 is provided directly on the substrate 2 without providing a metal film thereon, whereby, even if a resist pattern is formed by photo lithography, such as interference exposure, pattern falling and a constricted portion are not caused, and therefore, the fine grid pattern 3 can be formed with high precision by etching.

Furthermore, in the polarizing element 1, by switching between isotropic etching and anisotropic etching, the projection portion 10 including the base portion 10a and the tapered surface portion 10b provided on a top face of the base portion 10a is formed. By providing the base portion 10a, the projection portion 10 is made to have a predetermined height. Thus, in the polarizing element 1, the grid pattern 3 with a high contrast can be formed.

Figure 5:
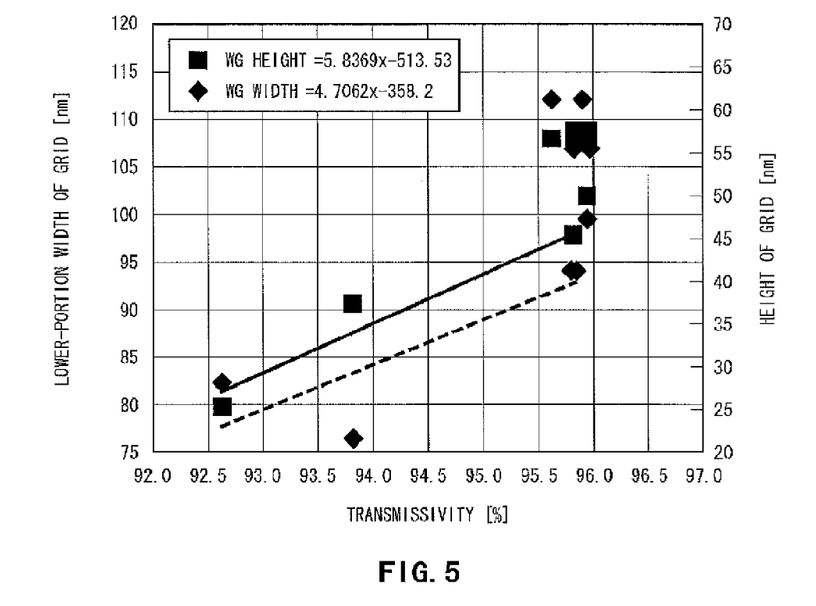
FIG. 5 illustrates graphs showing relations between each of a height T and a lower-portion width $W_1$ of the projection portion of the grid pattern and a corresponding average transmissivity of light having a bandwidth of 530 to 580 nm in the polarizing element.

Here, FIG. 5 shows relations between each of a height T and a lower-portion width $W_1$ of the projection portion 10 in the grid pattern 3 and a corresponding average transmissivity of light having a GREEN bandwidth (530 to 580 nm) in the polarizing element 1. As shown in FIG. 5, when the lower-portion width $W_1$ of the projection portion 10 is made to be not less than 95 nm and the height T of the projection portion 10 is made to be not less than 45 nm, the average transmissivity of the polarizing element 1 can be increased to approximately 96%. Note that, in the polarizing element 1 for which the measurement of an average transmissivity shown in FIG. 5 is taken, a grid pitch P is 148 nm, an angle of the tapered surface portion 10b of the projection portion 10 is 60°, a thickness of the inorganic fine particle layer 4 is 20 nm, and a thickness of a protection layer ($SiO_2$) is 20 nm.

In the polarizing element 1, approximately 4% of the irradiated light is lost in a face on which the projection portion 10 is provided, and hence, even if an anti-reflection coating is formed on another face opposite to the face having the projection portion 10 to make the loss 0%, the transmissivity is 96% at the maximum. Therefore, the lower-portion width $W_1$ of the projection portion 10 is made to be not less than 95 nm and the height T of the projection portion 10 is made to be not less than 45 nm, whereby an average transmissivity of the polarizing element 1 can be increased to the maximum.

Figure 6:
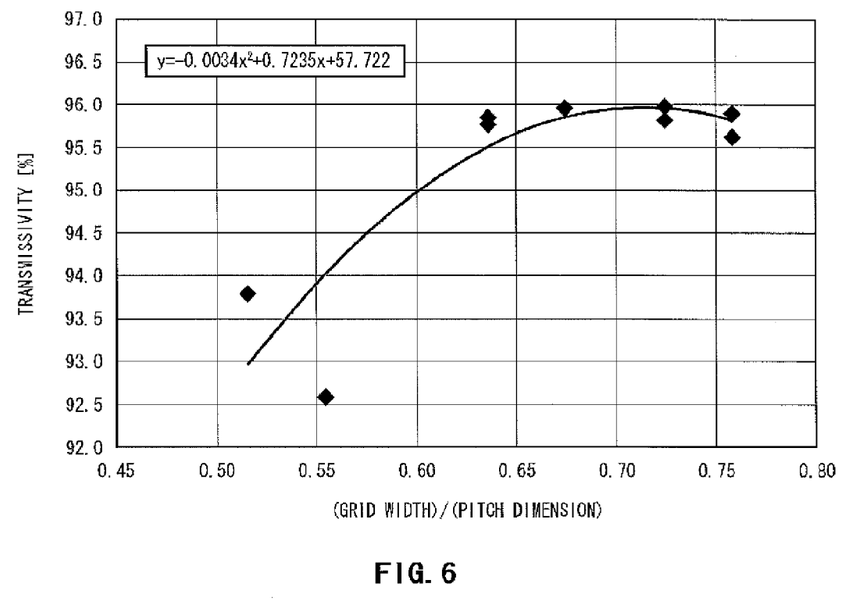
FIG. 6 illustrates a graph showing a relation between an average transmissivity of light having a bandwidth of 530 to 580 nm in the polarizing element and (a lower-portion width $W_1$ of the projection portion)/(a pitch P of the projection portion).

FIG. 6 shows a relation between an average transmissivity of light having a GREEN bandwidth (530 to 580 nm) in the polarizing element 1 and (a lower-portion width $W_1$ of the projection portion 10)/(a pitch P of the projection portion 10). When (a lower-portion width $W_1$ of the projection portion 10)/(a pitch P of the projection portion 10) is made to be not less than 0.55, average transmissivity characteristics can be made to be not less than 94%.

Figure 7:
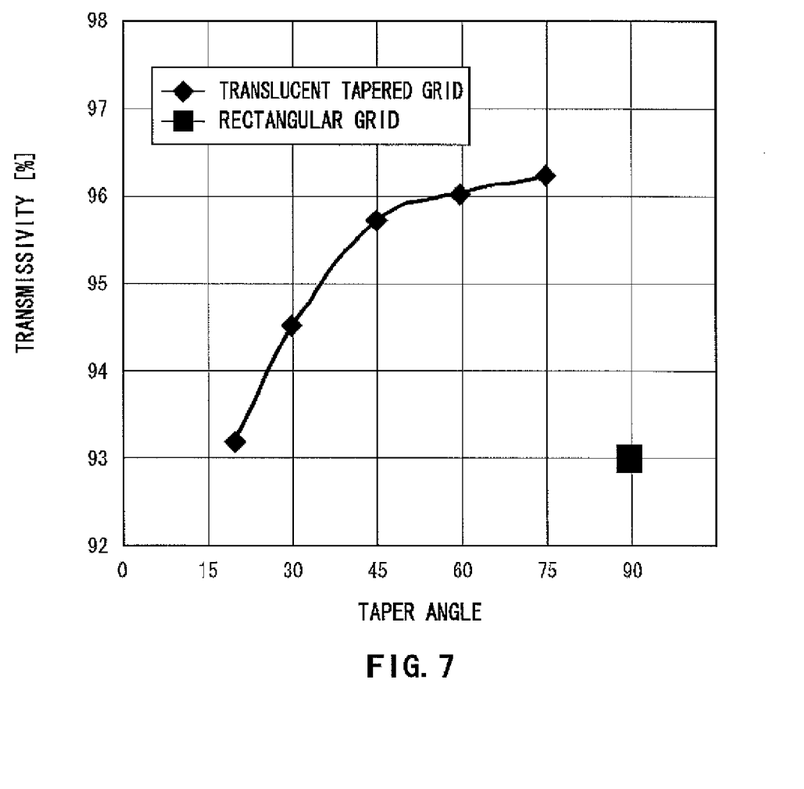
FIG. 7 illustrates a graph showing a relation between an average transmissivity of light having a bandwidth of 530 to 580 nm in the polarizing element and an angle A of a tapered surface portion 10b of a projection portion 10.

FIG. 7 shows a relation between an average transmissivity of light having a GREEN bandwidth (530 to 580 nm) in the polarizing element 1 and an angle A of the tapered surface portion 10b of the projection portion 10. As shown in FIG. 7, when the angle A of the tapered surface portion 10b in the polarizing element 1 shown in FIG. 1(A) and FIG. 1(B) is made to be 35° to 70°, an average transmissivity in the GREEN bandwidth having a wavelength of 530 to 580 nm can be made to be not less than 95%.

Note that, in the case where a projection portion with a rectangular cross-section was provided without forming the tapered surface portion 10b on a top of the projection portion, the average transmissivity remained 93% under the same conditions. The reason for this is that the fine particle layer 4 of the projection portion 10 constituting the grid pattern 3 is deposited on the projection portion with a rectangular cross-section, and, as a result, the fine particle layer protrudes over a side face of the projection portion between the projection portions, and blocks light to be transmitted between the projection portions 10.

[Moth Eye]

Furthermore, in the polarizing element 1, at the time of forming the base portion 10a of the projection portion 10, a convex line portion 11 which is lower in height than the projection portion 10 is formed between the projection portions 10 on a surface of the substrate 2. At the time of forming the base portion 10a in the substrate 2, both sides of the base portion 10a are shaved, whereby the convex line portion 11 is formed between the projection portions 10 along the projection portion 10. FIG. 8 shows a SEM image of the grid pattern 3.

By forming this convex line portion 11, in the grid pattern 3 of the polarizing element 1, a projection arrangement composed of the projection portion 10 and the convex line portion 11 is regularly formed, and thus a moth eye structure is built. Therefore, in the polarizing element 1, a refractive index in a thickness direction varies continuously, and accordingly light which strikes the substrate 2 is hardly reflected, and the transmissivity can be maintained high.

What is claimed is:

1. A polarizing element, comprising:
   a substrate transparent to light having a bandwidth to be used; and
   a grid pattern made of a translucent material and configured such that a plurality of projection portions continuous in one in-plane direction of the substrate are formed on a surface of said substrate at a pitch smaller than a wavelength of light having the bandwidth to be used, wherein
   each of the projection portions includes a base portion with a rectangular cross-section and a tapered surface portion formed at a top of the base portion,
   a fine particle layer made of inorganic fine particles is laminated on at least one surface of said tapered surface portion,
   the inorganic fine particles are distributed in an island shape on the at least one surface of the tapered surface portion,
   the fine particle layer does not protrude over a side face of the base portion, and
   the grid pattern has a convex line portion between the projection portions and forms a moth eye structure, the convex line portion being lower in height than the projection portion and comprising a plurality of continuous convex lines, each continuous convex line being rounded outward from the surface of the substrate, an entire width of each continuous convex line extending from one of the projection portions to an adjacent one of the projection portions.

2. The polarizing element according to claim 1, wherein each of the substrate and the grid pattern is made of an inorganic material.

3. The polarizing element according to claim 2, wherein each of the substrate and the grid pattern is made of rock crystal or sapphire.

4. The polarizing element according to claim 1, wherein a ratio of a width of the projection portion to a pitch of the projection portion is not less than 0.55.

5. The polarizing element according to claim 1, wherein an angle of the tapered surface portion is 30° to 75°.

6. The polarizing element according to claim 1, wherein a width of the projection portion is 50 nm to 200 nm, a height of the projection portion is 20 nm to 200 nm, an angle of the tapered surface portion is 30° to 75°, and a pitch of the projection portion is 100 nm to 250 nm.

7. The polarizing element according to claim 1, wherein, in the substrate, an anti-reflection coating to control a reflection component to incident light is provided on a face opposite to a face on which the grid pattern is formed.

8. A method for manufacturing a polarizing element, comprising the steps of:
  forming a grid pattern configured such that a plurality of projection portions are formed on a translucent substrate at a pitch smaller than a wavelength of light having a bandwidth to be used, each of the projection portions being continuous in one in-plane direction of the translucent substrate and including a base portion with a rectangular cross-section and a tapered surface portion formed at a top of the base portion; and
  forming a fine particle layer not protruding over a side face of the base portion, by laminating inorganic fine particles on the tapered surface portion from an oblique direction, the inorganic fine particles being distributed in an island shape on the tapered surface portion, wherein
  the grid pattern has a convex line portion between the projection portions and forms a moth eye structure, the convex line portion being lower in height than the projection portion and comprising a plurality of continuous convex lines, each continuous convex line being rounded outward from the surface of the substrate, an entire width of each continuous convex line extending from one of the projection portions to an adjacent one of the projection portions.

9. The method for manufacturing the polarizing element according to claim 8, wherein, in accordance with a height of the base portion and an angle of the tapered surface portion, an incident angle of the inorganic fine particles is set so that the fine particle layer is formed only on the tapered surface portion.

10. The method for manufacturing the polarizing element according to claim 8, wherein the projection portion and the convex line portion are formed by using anisotropic etching and isotropic etching step by step.

11. The method for manufacturing the polarizing element according to claim 8, wherein the convex line portion is formed between base portions in the substrate, at the time of forming the base portion.

12. The method for manufacturing the polarizing element according to claim 11, wherein the convex line portion is formed between the projection portions in the substrate by shaving both sides of the base portion.

* * * * *